(12) United States Patent
Lobo et al.

(10) Patent No.: US 9,374,461 B2
(45) Date of Patent: Jun. 21, 2016

(54) BUSINESS DIRECTORY ASSISTANCE VIA STB

(71) Applicant: Verizon Patent and Licensing Inc., Basking Ridge, NJ (US)

(72) Inventors: David Lobo, Frisco, TX (US); Sherrill A. Moss, Johns Creek, GA (US); Apurva Pathak, White Plains, NY (US); Mary T. Thomas, Dallas, TX (US); Carson C. Burrus, Dallas, TX (US); Rachna R. Sheth, White Plains, NY (US); Sundar Rajan Padmanabhan, Irving, TX (US); Xiaodong Zhang, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 142 days.

(21) Appl. No.: 14/090,598

(22) Filed: Nov. 26, 2013

(65) Prior Publication Data

US 2015/0146576 A1    May 28, 2015

(51) Int. Cl.
*H04W 4/16* (2009.01)
*H04M 3/493* (2006.01)
*G06Q 30/02* (2012.01)

(52) U.S. Cl.
CPC ......... *H04M 3/4935* (2013.01); *G06Q 30/0224* (2013.01); *H04W 4/16* (2013.01)

(58) Field of Classification Search
None
See application file for complete search history.

(56) References Cited

U.S. PATENT DOCUMENTS

| | | | |
|---|---|---|---|
| 2004/0006478 A1* | 1/2004 | Alpdemir | G06Q 30/02 704/275 |
| 2010/0023965 A1* | 1/2010 | Malik | 725/32 |
| 2010/0154021 A1* | 6/2010 | Howarter et al. | 725/141 |
| 2011/0208575 A1* | 8/2011 | Bansal | G06Q 30/02 705/14.25 |
| 2012/0232974 A1* | 9/2012 | Castiglione | G06Q 30/0215 705/14.21 |
| 2013/0019004 A1* | 1/2013 | Sylvain | H04M 3/42374 709/224 |
| 2013/0073473 A1* | 3/2013 | Heath | 705/319 |

* cited by examiner

*Primary Examiner* — Ian N Moore
*Assistant Examiner* — Lakeram Jangbahadur

(57) ABSTRACT

A set-top box (STB) obtains a listing of businesses responsive to a request for a business directory search from a customer. The STB receives, from a customer, a selection of a business from the listing of businesses to call. The STB performs one of: initiating, at the STB, a Voice over Internet Protocol (VoIP) call to a phone number associated with the business and connecting the VoIP call to a mobile device, or other VoIP device, associated with the customer via a VoIP network, or initiating, at the STB, establishment of a call between a phone number associated with the business and a mobile device associated with the customer via a telephone network. The STB sends data associated with the request for the business directory search to a billing server for billing the customer for the request for the business directory search received at the STB.

20 Claims, 15 Drawing Sheets

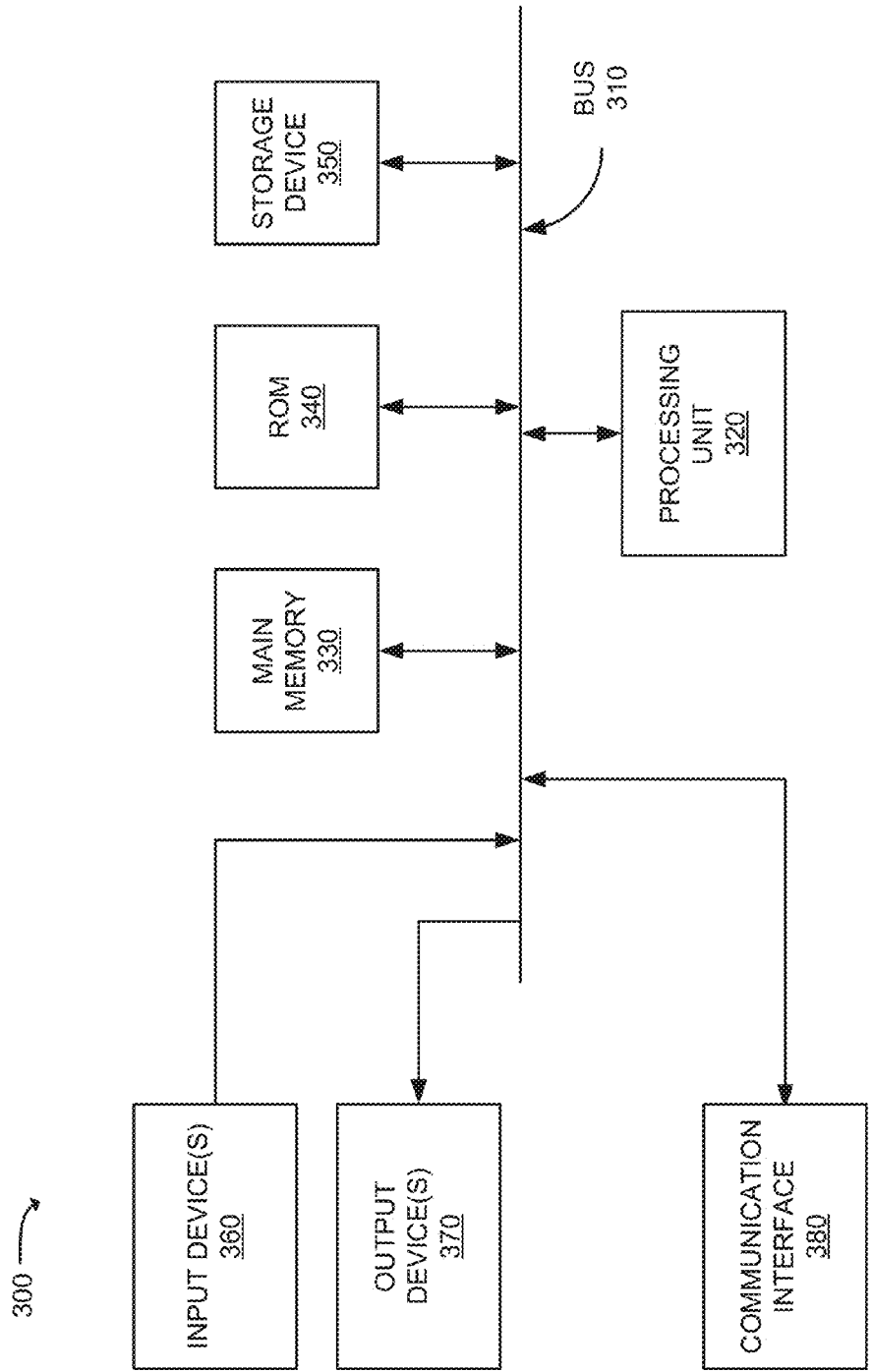

BUSINESS DIRECTORY ASSISTANCE VIA STB

BACKGROUND

Set-Top Boxes (STBs) are used for selecting among channels on a network, such as, for example, a cable network (e.g., an optical fiber network), to enable content transmitted on those channels to be displayed on display devices (e.g., televisions) connected to the STBs. The STB user may use a remote device to switch channels on the STB, or to provide input for controlling other functions on the STB. The remote device may be used, for example, for controlling the STB's digital video recorder (DVR), for accessing a digital television programming guide, for interacting with a user interface of the STB, or for turning on or off specific settings on the STBs (e.g., turning on closed captioning, setting display width, etc.). The STB's DVR may also include functionality for scheduling the recurring recording of a series of television programming.

BRIEF DESCRIPTION OF THE DRAWINGS

FIG. 3 is a diagram of exemplary components of a network device that corresponds to the mobile device, the search server, and the coupon server of FIGS. 1A-1C;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein enable a customer to initiate business directory assistance requests from a set-top box. The business directory search results returned to the customer's set-top box, based on the assistance requests, may include digital coupons that further include one or more offers, specials or deals for products and/or services. The set-top box may send the digital coupons to a separate mobile device (e.g., a mobile telephone, device installed in an automobile) associated with the customer, or may send links associated with the digital coupons to the separate mobile device. The customer may use the digital coupons received at the customer's mobile device for purchasing products or services. The customer may also request the future, pro-active delivery of the coupons. This delivery can be customized for receipt by medium (mobile device, automobile installed device, set-top box and television, desktop, tablet computer and/or other connected devices). Additional customization of the delivery of the coupons may be done by proximity (e.g., distance to a particular business, distance from a particular business) or context (e.g., received a coupon for a movie theater and subsequent coupon for dinner at XYZ restaurant). The customer may also receive a notification of coupon expiration.

In other embodiments described herein, a customer may also initiate business directory assistance requests from the set-top box and, when the business directory search results are returned, the customer may use "click-to-dial" functionality from the returned business directory search results to initiate, from the set-top box, a phone call to one of the businesses in the search results. In one implementation, the set-top box may initiate a VoIP call between the business's telephone number and either the customer's mobile device, or another VoIP device associated with the customer (e.g., VoIP phone) via an Internet Protocol network. In a further implementation, the set-top box may initiate a telephone call between the business's telephone number and either the customer's mobile device, or another telephone associated with the customer (e.g., a landline telephone) via a telephone network (e.g., a Public Switched Telephone Network or a cellular network).

Figure 1A:
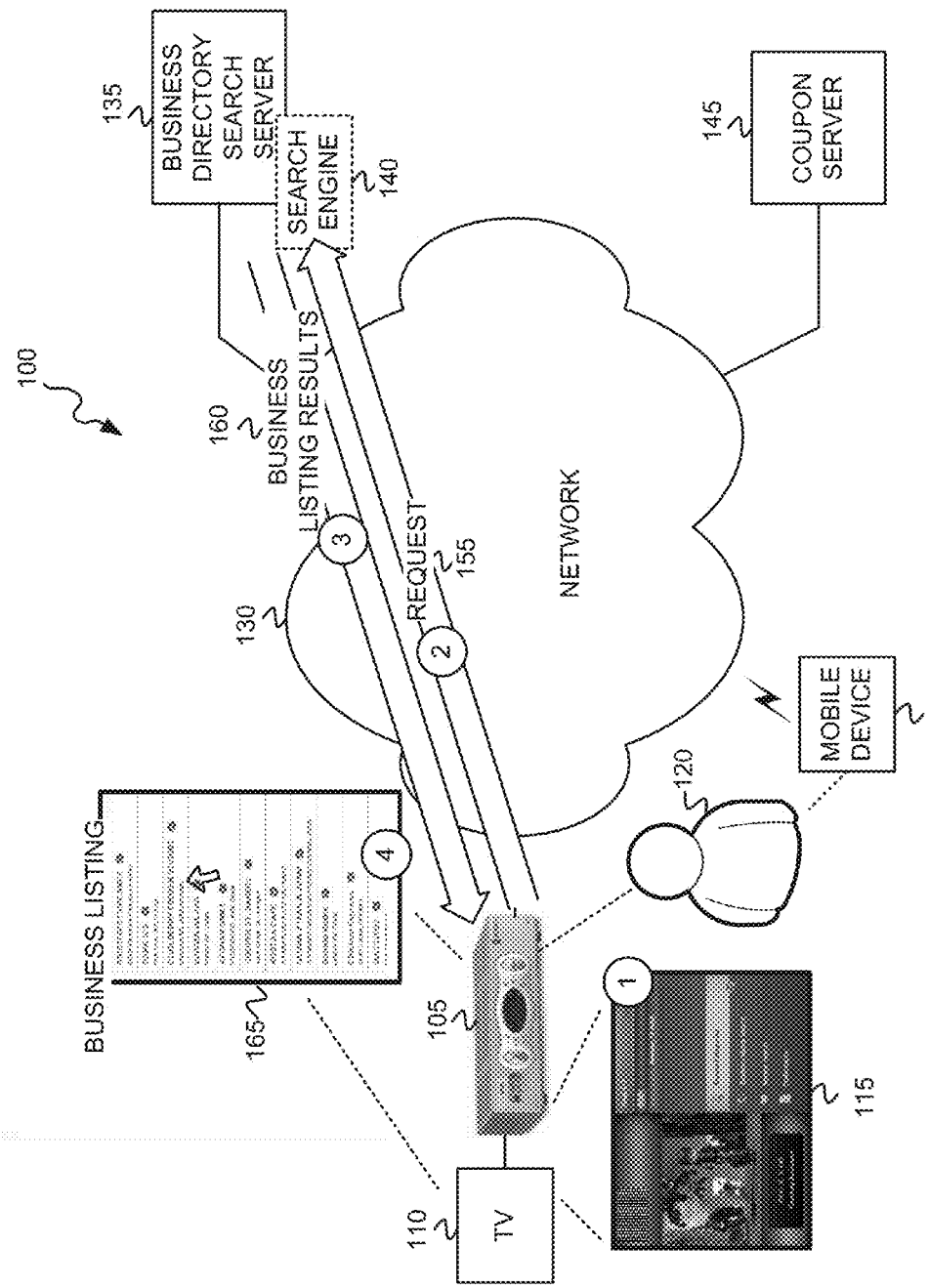
FIGS. 1A-1C are diagrams that depict an overview of an exemplary embodiment in which a set-top box user may obtain search for and obtain relevant business listings via the user's set-top box, and a coupon associated with a business of the relevant business listings may be provided to the user at a mobile device of the user that is different than the STB.
Figure 1B:
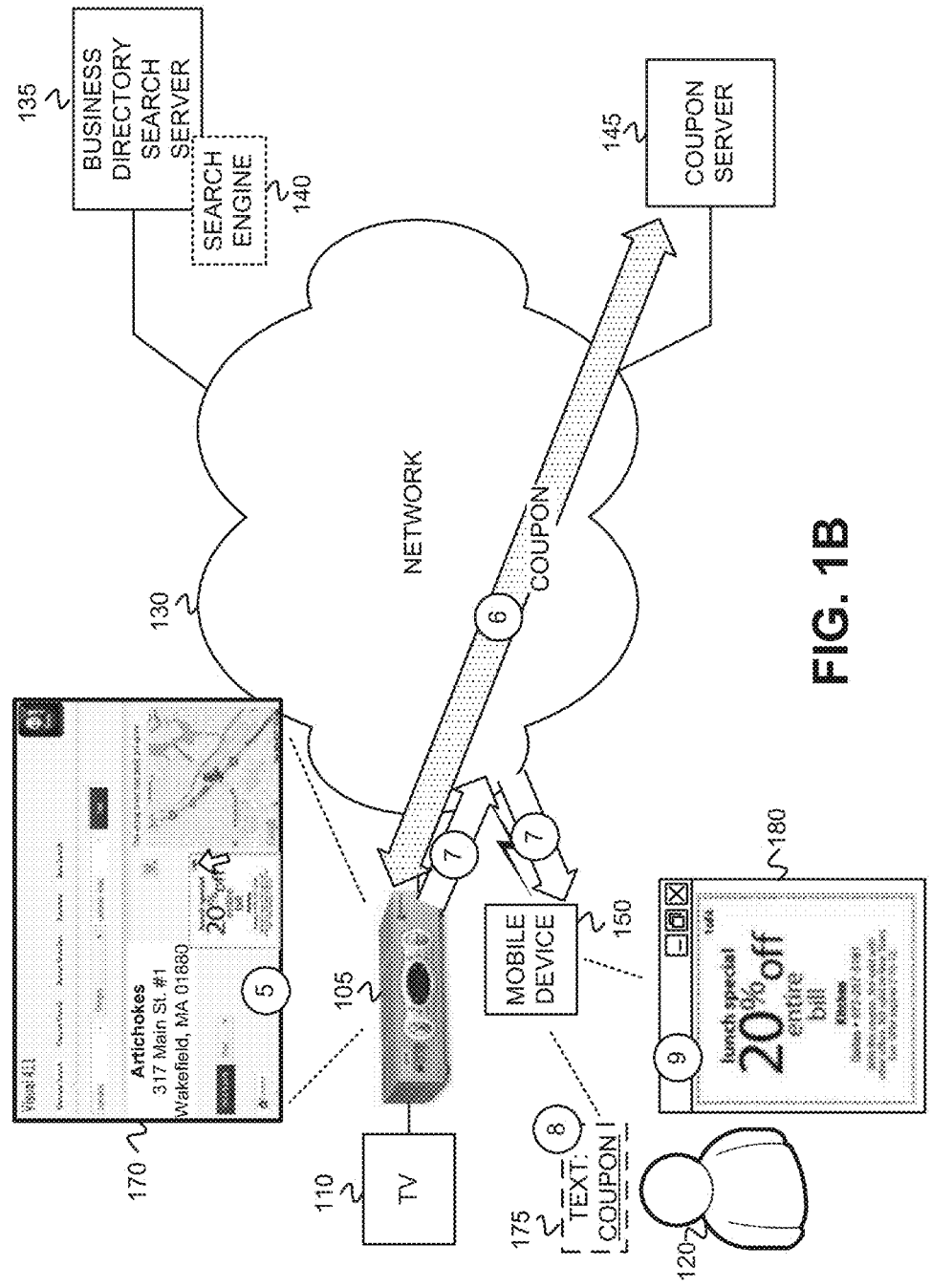
Figure 1C:
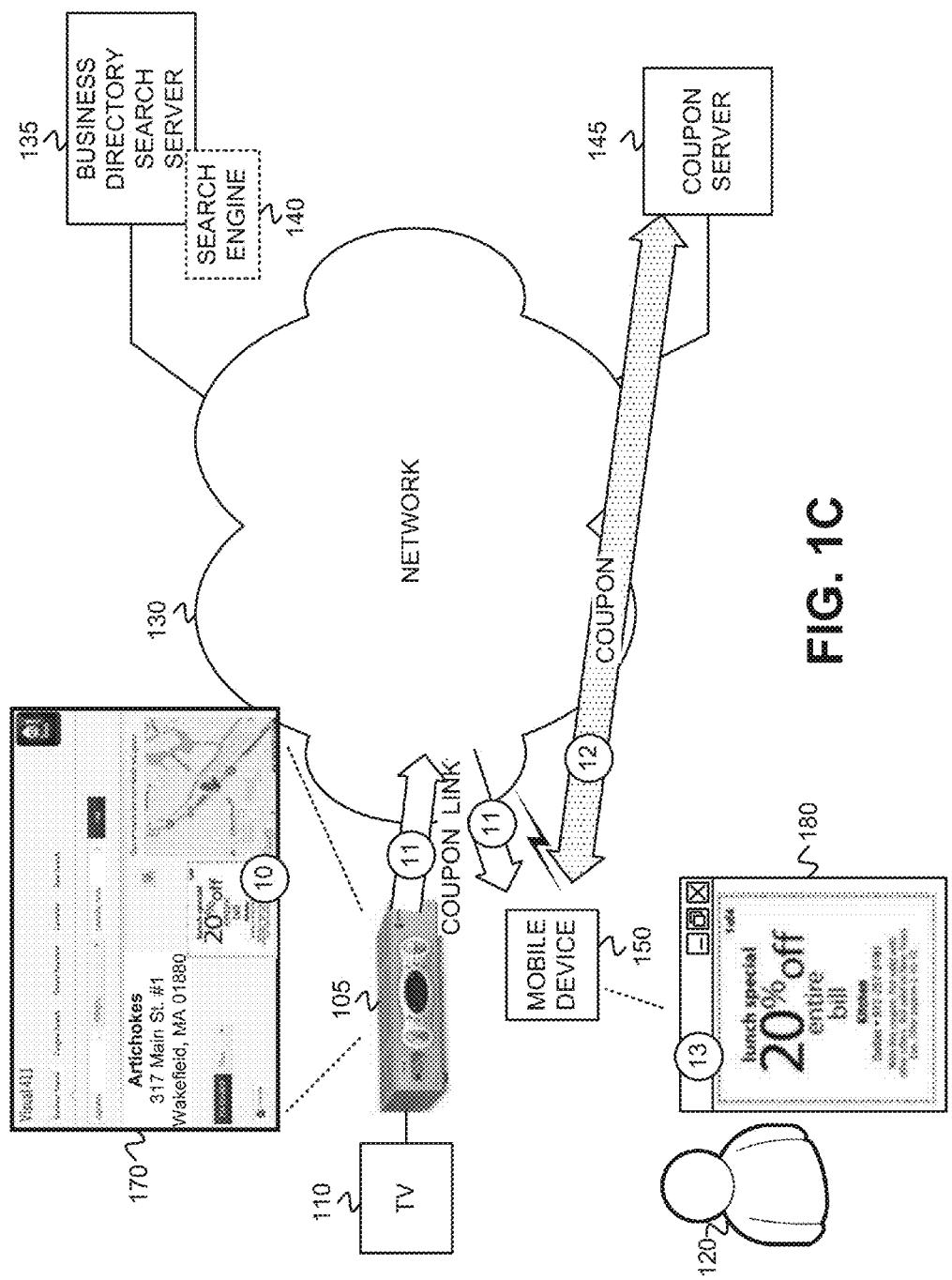

FIGS. 1A-1C depict an overview of an exemplary embodiment in which a set-top box (STB) user may search for and obtain relevant business listings via the user's STB, and a coupon associated with a business of the relevant business listings may be provided to the user at a mobile device of the user that is different than the STB. In FIG. 1A, an exemplary network environment 100 may include a STB 105, a television (TV) 110, a network 130, a business directory search server 135, a coupon server 145, and a mobile device 150. As shown in FIG. 1A, a customer 120 may be associated with STB 105 and mobile device 150.

STB 105 may receive content, from content service provider(s) (not shown), over network(s) 130 for presentation to customer 120 via TV 110. STB 105 may, for example, receive the content via one or more channels (e.g., Quadrature Amplitude Module (QAM) channels) over network(s) 130. The content may include, for example, TV video programs.

Business directory search server 135 may include a network device that receives business directory assistance requests from customer 120 via STB 105, searches a database of business listings (not shown) using a search engine 140, and provides results that includes a listing of business that are relevant to search parameters contained in the business directory assistance requests. Search engine 140 may search the database of business listings using the search parameters (e.g., business keyword and/or geographic location) contained in the business directory assistance requests received from customer 120 via STB 105.

Coupon server 145 may include a network device that provides coupons related to products and/or services offered by businesses searched by search server 135. The coupons may offer various specials, discounts, and/or deals associated with the products and/or services offered by the businesses. Mobile device 150 may include a portable computing device having wired or wireless connectivity, such as, for example, a desktop, laptop, palmtop or tablet computer; a cellular telephone (e.g., a "smart" phone); or a personal digital assistant (PDA). In some implementations, mobile device 150 may be a device installed in an automobile.

Network(s) 130 may include one or more networks of various types including, for example, a cable network (e.g., an optical cable network), a satellite network, a telecommunications network (e.g., a Public Switched Telephone Network (PSTN) or Public Land Mobile Network (PLMN)), an Advanced Television Systems Committee (ATSC) standards network, a local area network (LAN), a wide area network (WAN), a metropolitan area network (MAN), an intranet, and/or the Internet. Network(s) 130 may, in some implementations, include one or more QAM channels (or other types of modulated or broadcast channels) for delivering content and Electronic Program Guide (EPG) data to STB 105.

The configuration of network components of network environment 100 illustrated in FIG. 1A is for illustrative purposes only. Other configurations may be implemented. Network environment 100 may include additional, fewer and/or different components than those depicted in FIG. 1A. For example, a single customer 120, STB 105 and mobile device 150 are shown in FIG. 1A. Multiple customers 120, STBs 105 and mobile devices 150, however, may connect to network(s) 130 and may send business directory assistance requests to search server 135.

As depicted in FIG. 1A (and in FIGS. 1B, 1C and 10, all discussed below), circled numbers in any figure depict a sequence of activity depicted by that figure. A customer 120, as shown in FIG. 1A, may, via a business directory user interface 115 presented at TV 110 from STB 105 (shown sequentially with a "1" in FIG. 1A), initiate activity by causing a business directory assistance request 155 (shown with a "2") to be sent from STB 105 to search engine 140 at server 135. Request 155 may include search parameters associated with the businesses that customer 120 wishes to search. The parameters may include, for example, a business location (e.g., a city, a specific geographic location etc.) and/or a business name or business keyword (e.g., a business type). Upon receipt of request 155, search engine 140 may search, using existing search algorithms, a corpus of businesses and may return business listing results 160 that are relevant to the parameters contained in request 155. Server 135 may send business listing results 160 (shown with a "3") to STB 105 for presentation to customer 120 as a business listing 165 (shown with a "4") via TV 110.

Customer 120 may subsequently select, via interaction with STB 105, a specific business from business listing 165 and, as further shown in FIG. 1B, STB 105 may present information 170 associated with the selected business via TV 110 to customer 120. The information may include the business's address, phone number, email address, webpage(s), and one or more coupons associated with the selected business. The one or more coupons may include discounts, specials, or deals that the business is offering to customer 120 and which customer 120 may use to purchase product and/or services from the business.

Upon selection of a coupon from the presented information 170, STB 105 may, as shown in FIG. 1B, retrieve (shown with a "6") coupon data from coupon server 145 and may send (shown with a "7") the coupon data to mobile device 150 via network 130 as a coupon 175 (shown with a "8") comprising text only (e.g., a text message), or may send a coupon 180 (shown with a "9") that comprises text, graphics, and/or images. Coupon 180 may further include a bar code that, when displayed at mobile device 150, may be read by a bar code scanner.

Alternatively, upon selection of a coupon from the presented information 170, STB 105 may, as depicted in FIG. 1C, send (shown with a "11") a message to mobile device 150 that includes a coupon link. The coupon link may include, for example, a Uniform Resource Locator (URL) associated with storage of the coupon at coupon server 145. Upon receipt of the coupon link, mobile device 150 may use the coupon link to retrieve (shown with a "12") coupon 180 from coupon server 145 for presentation (shown with a "13") at mobile device 150 to customer 120.

Figure 2:
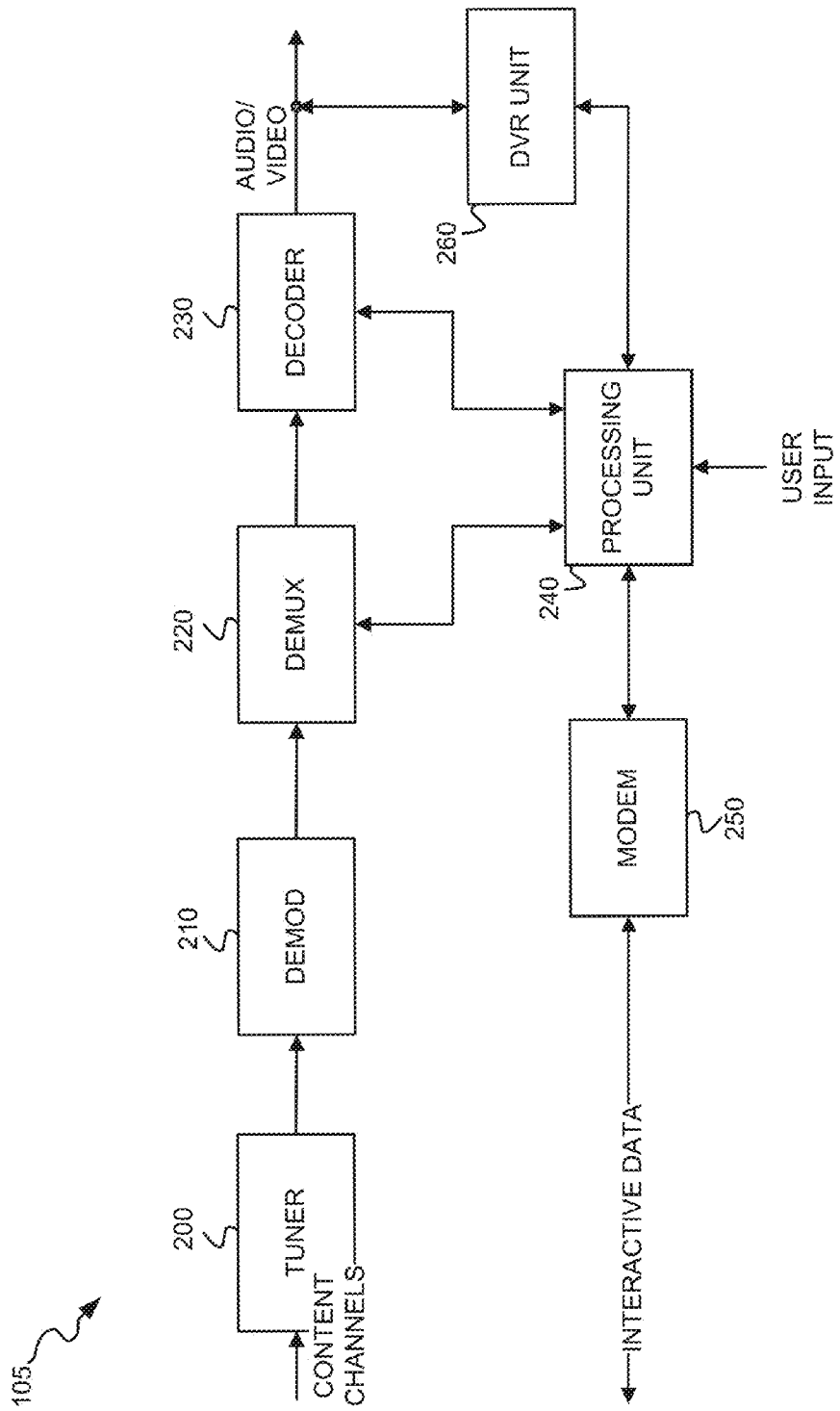
FIG. 2 depicts exemplary components of the set-top box of FIGS. 1A-1C.

FIG. 2 depicts exemplary components of STB 105. STB 105 may include a tuner 200, a demodulator 210, a demultiplexer 220, a decoder 230, a processing unit 240, a modem 250, and a DVR unit 260. Tuner 200 may select and tune to specific broadcast television information by tuning to one of many different input channels. Each channel may be digitally modulated using, for example, QAM, though other types of modulation may be used. Demodulator 210 may demodulate the information in the channel selected by tuner 200 to produce a transport stream (e.g., MPEG-2 or MPEG-4 transport stream) containing the audio, video and/or other information related to a selected TV program.

Demultiplexer 220 may select and decrypt compressed audio and video from the transport stream for the particular TV program that the customer 120 or device user wishes to watch. Decoder 230 may decode and decompress the decrypted audio and video information for the selected TV program. Processing unit 240 may include, for example, a microprocessor that controls the operations performed by tuner 200, demodulator 210, demultiplexer 220, decoder 230, modem 250 and DVR unit 260 based on user input (e.g., input received from customer 120 via a remote control device, not shown). Processing unit 240 may execute instructions to perform the exemplary processes of FIGS. 4A & 4B and FIGS. 11A & 11B. Modem 250 may send and receive interactive data (e.g., EPG data) that may be processed by processing unit 240. DVR unit 260 may digitally record, and store, audio and video content associated with the particular TV program decoded by decoder 230.

The configuration of components of STB 105 in FIG. 4 is for illustrative purposes only. Other configurations may be implemented. STB 105 may include additional, fewer and/or different components than those depicted in FIG. 2. For example, STB 105 may include a memory device (not shown) for storing instructions for execution by processing unit 240.

FIG. 3 is a diagram of exemplary components of a network device 300. Each of mobile device 150, search server 135 and coupon server 145 may be configured identical to, or similar to, network device 300 shown in FIG. 3. Network device 300 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of network device 300.

Processing unit 320 may include one or more processors or microprocessors, or processing logic, which interprets and executes instructions. Main memory 330 may include a random access memory (RAM) or another type of dynamic storage device that stores information and instructions for execution by processing unit 320. ROM 340 may include a ROM device or another type of static storage device that stores static information and instructions for use by processing unit 320. Storage device 350 may include a magnetic and/or optical recording medium. Main memory 330, ROM 340, and storage device 350 may each be referred to herein as a "tangible non-transient computer-readable medium."

Input device 360 may include one or more mechanisms that permit customer 120 to input information to network device 300, such as, for example, a keypad or a keyboard, a display with a touch sensitive panel, voice recognition and/or biometric mechanisms, etc. Output device 370 may include one or more mechanisms that output information to customer 120, including a display, a speaker, etc. Communication interface 380 may include any type of transceiver that enables network device 300 to communicate with other devices and/or systems. For example, communication interface 380 may include wired or wireless transceivers for communicating via network(s) 130.

The configuration of components of network device 300 in FIG. 3 is for illustrative purposes only. Other configurations may be implemented. Network device 300 may include additional, fewer and/or different components than those depicted in FIG. 3.

Figure 4A:
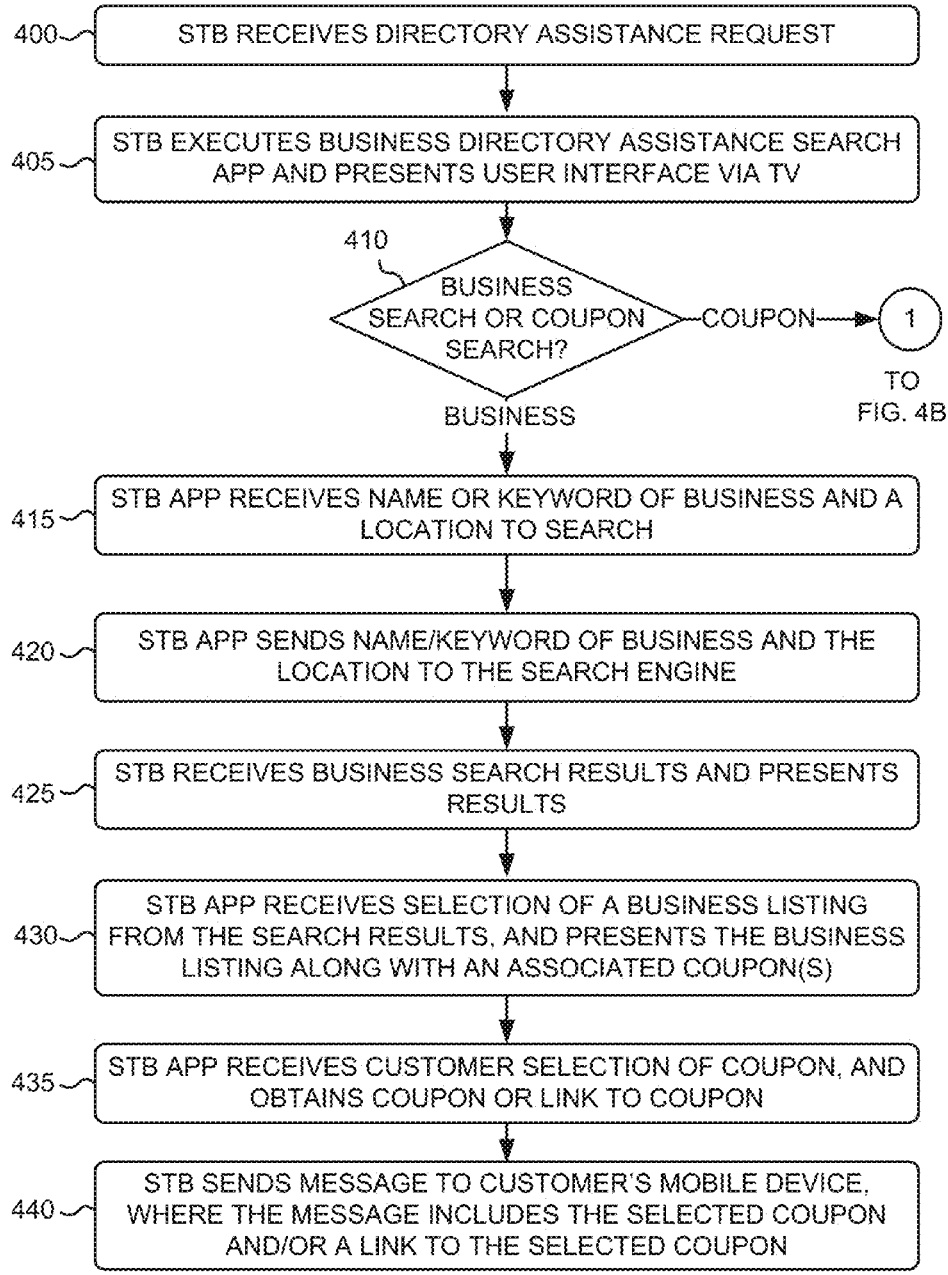
FIGS. 4A and 4B are flow diagrams that illustrate an exemplary process for performing a business directory search via a set-top box to obtain relevant business listings or a set of business coupons for a requesting customer, and for providing a coupon associated with customer-selected businesses or the set of business coupons to a mobile device of the customer.
Figure 4B:
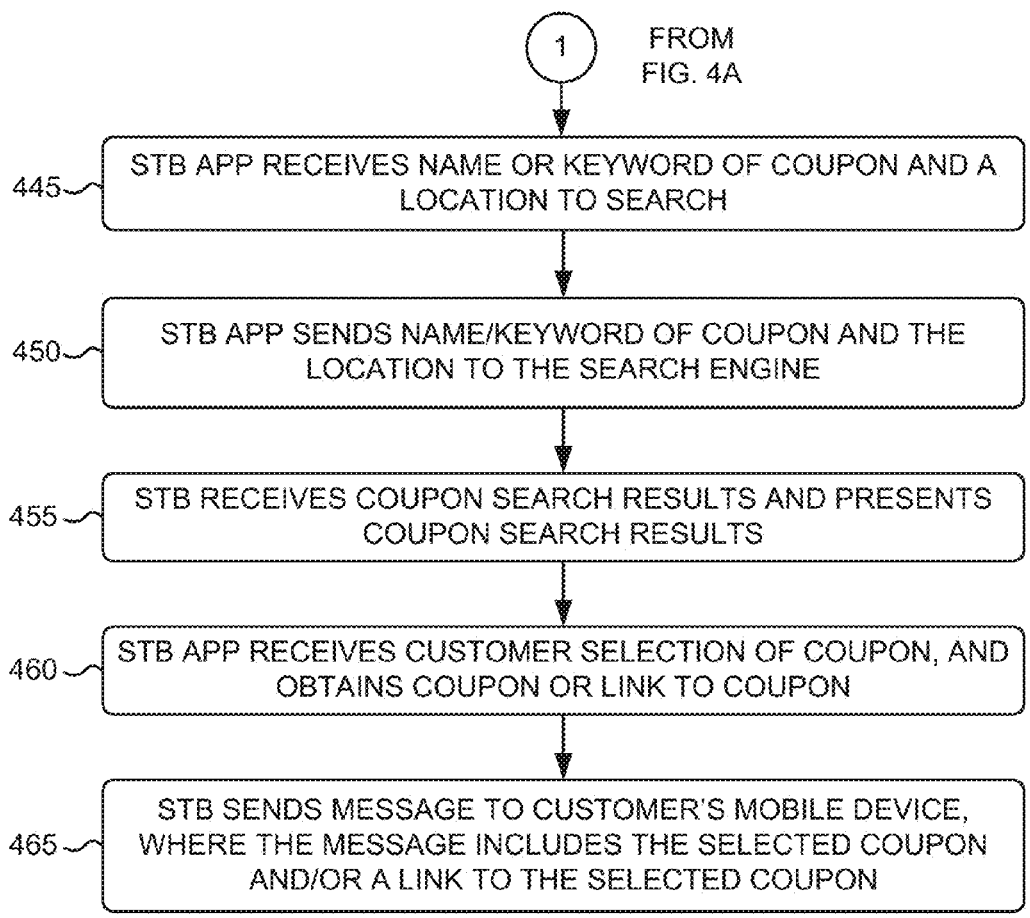

FIGS. 4A and 4B are flow diagrams that illustrate an exemplary process for performing a business directory search via a STB to obtain relevant business listings, or a set of business coupons, for a requesting customer, and for providing a coupon associated with customer-selected businesses, or from the set of business coupons, to a mobile device of the customer. The exemplary process of FIGS. 4A and 4B may be implemented by STB 105. The exemplary process of FIGS. 4A and 4B is described below with respect to FIGS. 5-9.

Figure 5:
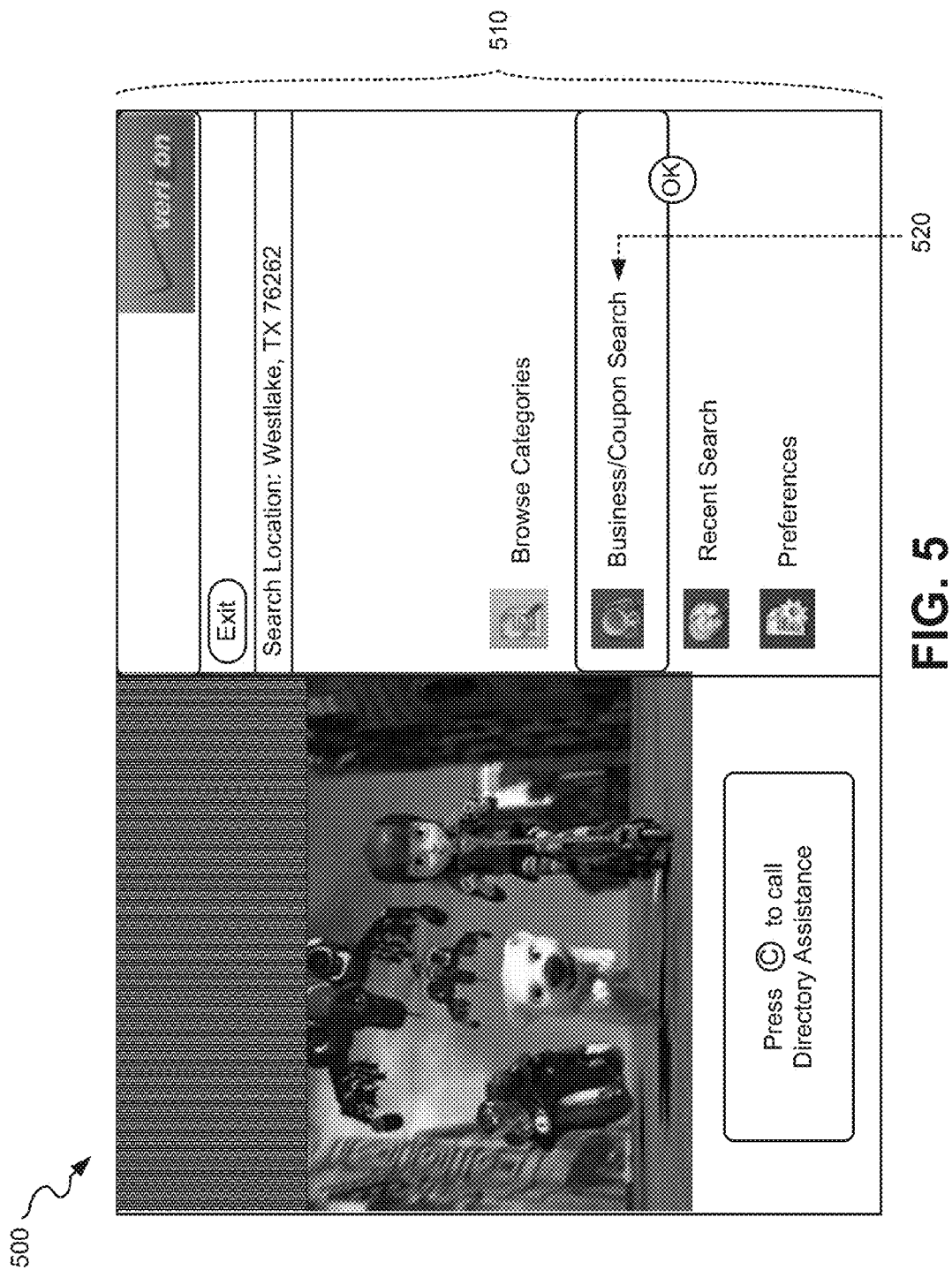
FIGS. 5-9 are diagrams that depict exemplary user interface screens associated with the exemplary process of FIGS. 4A and 4B.
Figure 6:
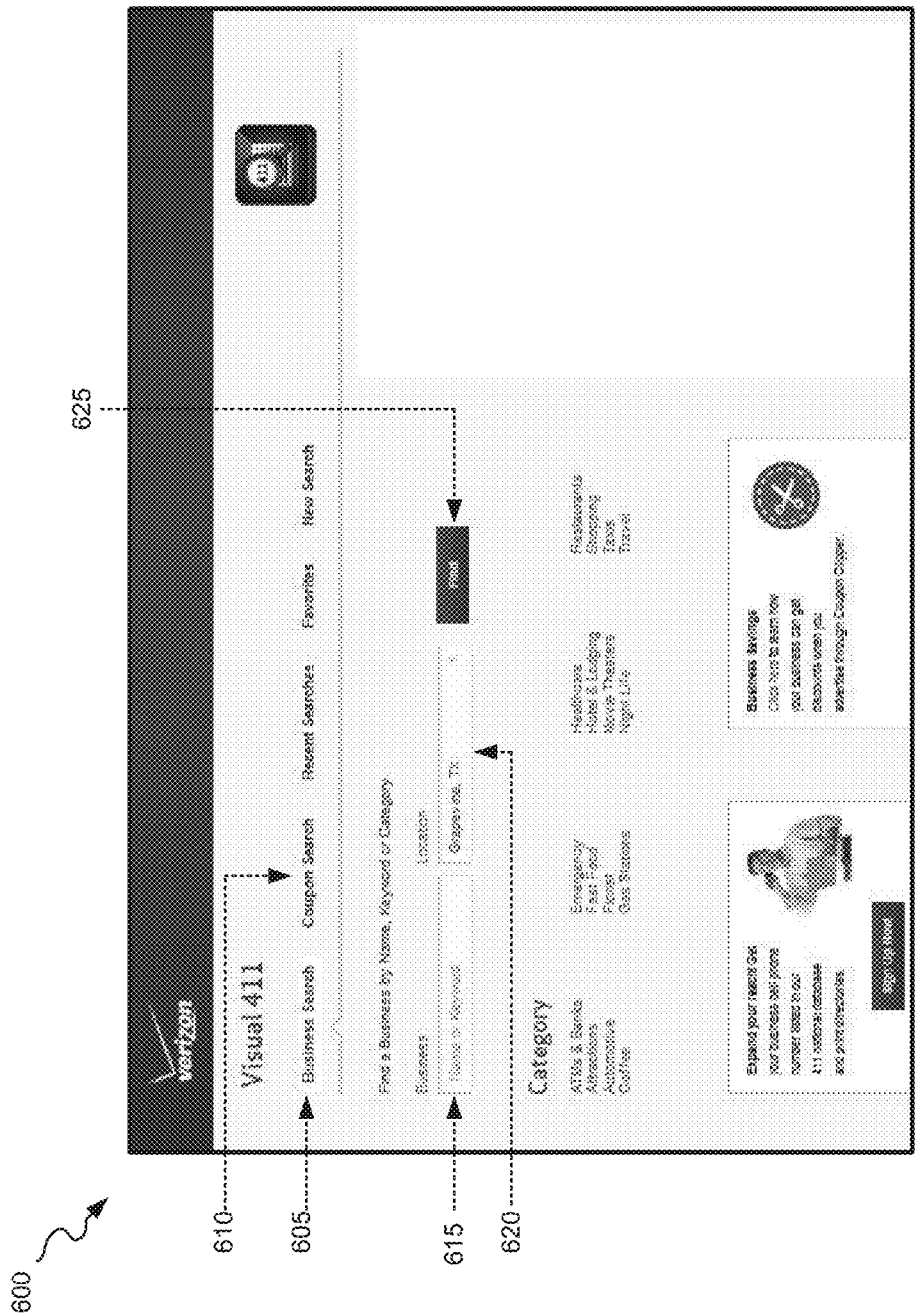

The exemplary process may include STB 105 receiving a directory assistance request (block 400) and, upon receipt of the request, STB 105 executes a business directory assistance search application (app) and presents a user interface via TV 110 (block 405). FIG. 5 depicts a user interface screen 500 that may be provided by STB 105 via TV 110. As shown, user interface screen 500 includes a menu 510 that permits customer 120 to select a business/coupon search 520 that enables the customer 120 to perform a business search or a business coupon search.

STB 105 determines whether a business search or a coupon search has been selected by customer 120 (block 410). Subsequent to the selection of business search 520 from user interface screen 500, STB 105 may present, via TV 110, a user interface screen 600 that permits customer 120 to select either a business search 605 or a coupon search 610. If a coupon search is selected (COUPON—block 410), then the exemplary process continues at block 445 below. If a business search is selected (BUSINESS—block 410), then the app at STB 105 receives a name or keyword of a business and a location to search from customer 120 (block 415). Referring to the user interface screen 600 of FIG. 6, customer 120 may select, in a name/keyword field 615, a name or keyword associated with a business which customer 120 wishes to search. The name may include all, or a portion of, a specific business name, and the keyword may include any word, or portion of a word, that may be associated with a specific business or a type of business. Additionally, customer 120 may select, in a location field 620, a geographic location which the customer wishes to search. The geographic location may include a specific city, or a current location associated with STB 105 or mobile device 150. Other types of search parameters, not shown in FIG. 6, may be selected from user interface screen 600. Such parameters may include, for example, a distance parameter (to identify businesses within a specified distance from STB 105 or mobile device 105), a price parameter (e.g., to identify businesses having low or high prices), or product and/or service parameters (e.g., that identify one or more products or services being searched by customer 120).

Figure 7:
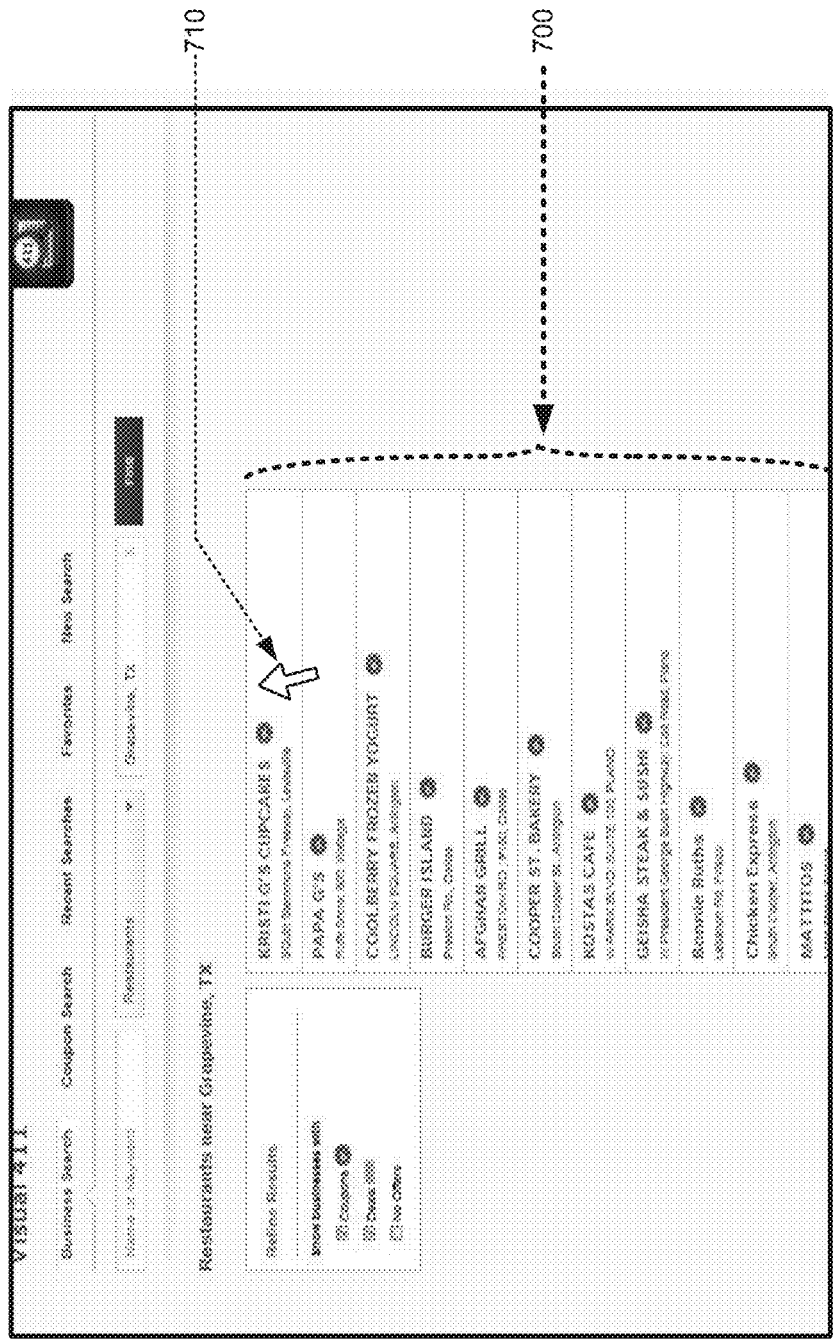

The app at STB 105 sends the name or keyword of the business and the location to search engine 140 at server 135 (block 420). Upon receipt of the business name/keyword and/or the location in block 415, customer 120 may select the "find" button 625 in user interface screen 600 to cause the name/keyword of the business and the location to be sent (block 420) to search engine 140 at search server 135. STB 105 receives business search results and presents the search results as a set of business listings (block 425). FIG. 7 depicts a set 700 of business listings received from search engine 140 and presented to customer 120. As shown in FIG. 7, customer 120 may select a listing 710 from the set 700 of business listings to obtain further information regarding listing 710, and to obtain any coupons offered by the business of listing 710.

Figure 8:
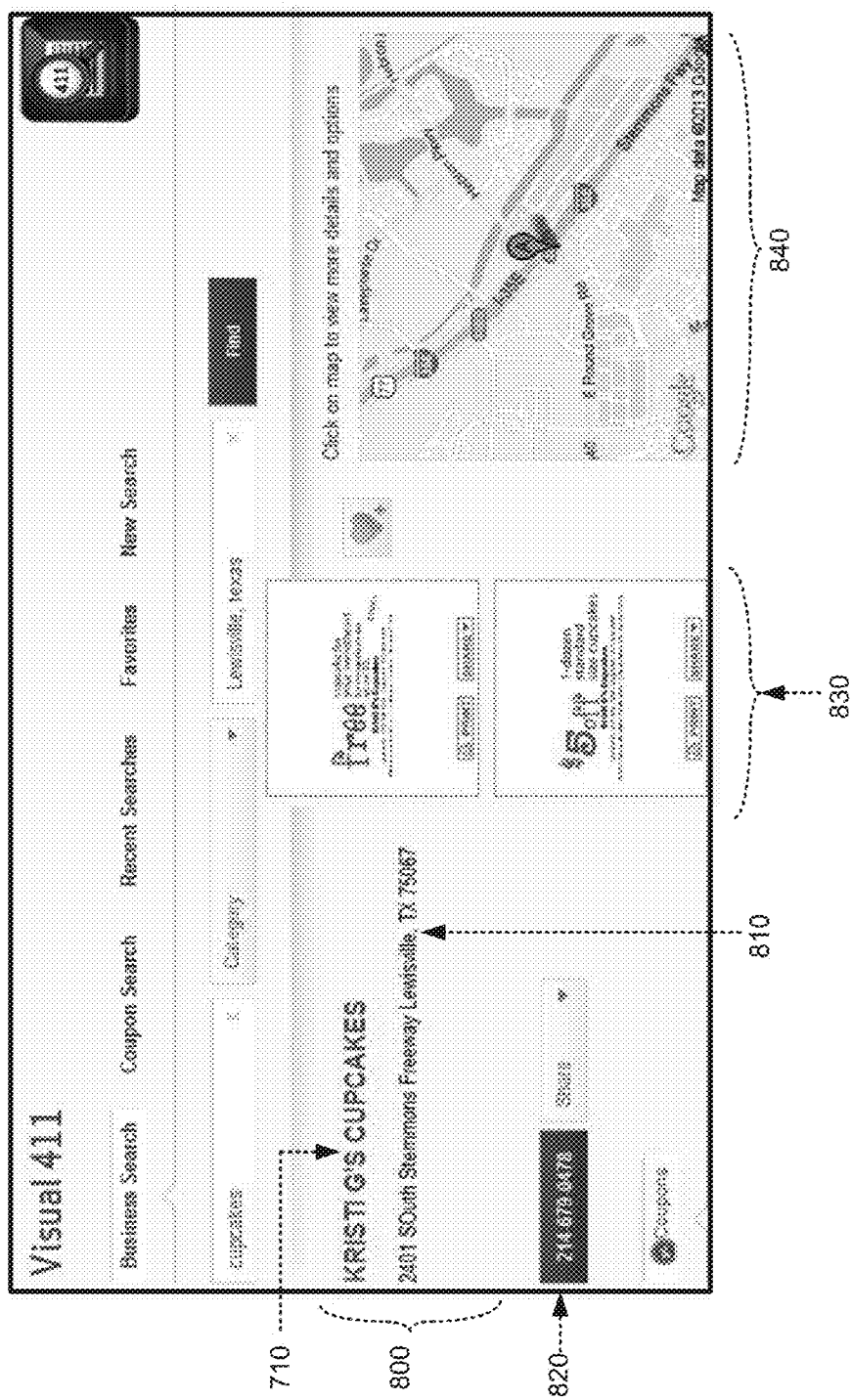
Figure 9:
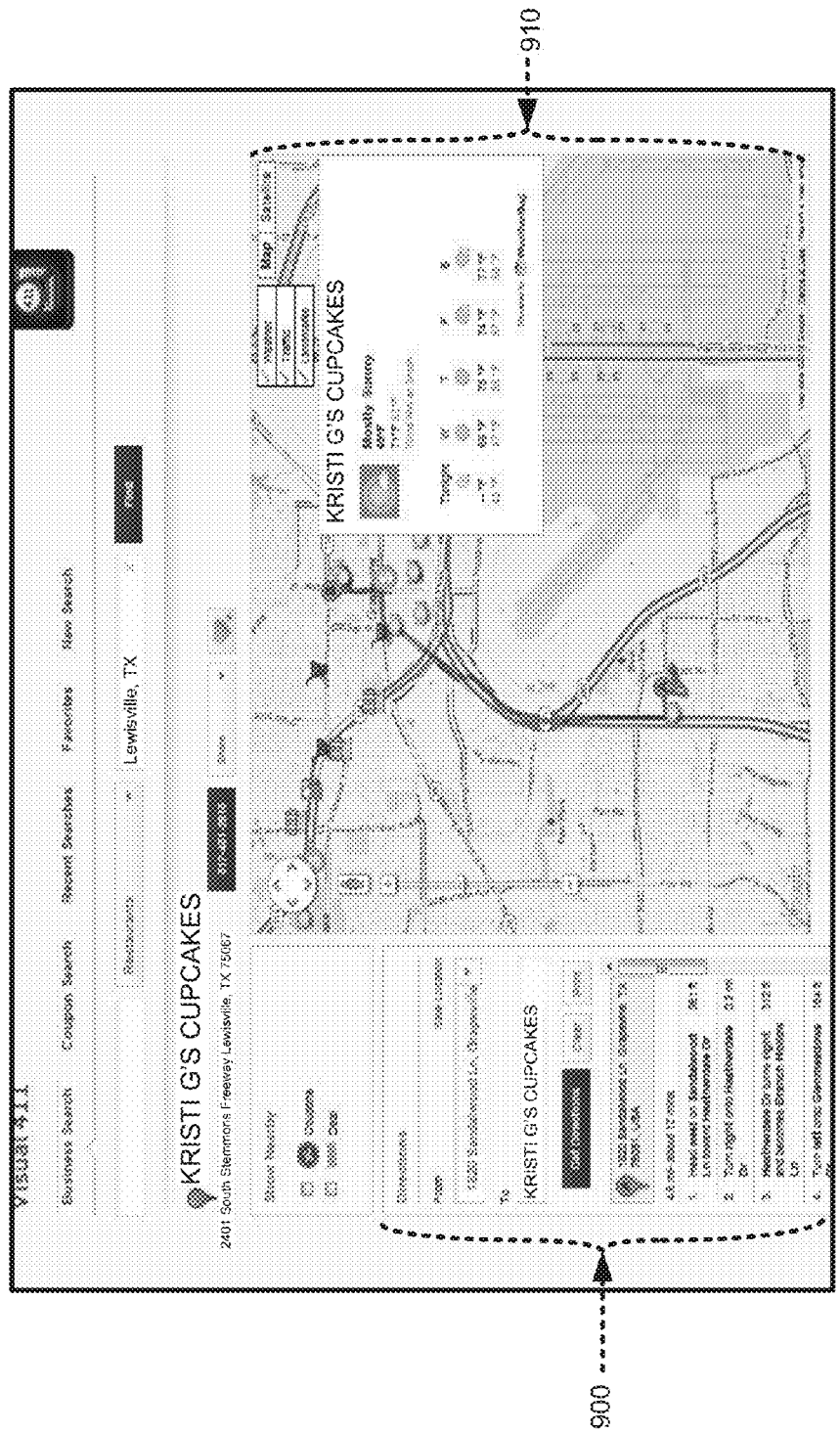

The app at STB 105 receives a selection of a business listing from the search results, and presents the business listing along with an associated coupon(s) to customer 120 (block 430). Once the listing 710 from the set 700 of business listings is selected, the app at STB 105 presents, as shown in FIG. 8, details 800 of the selected business listing 710 (including address information 810), the telephone number 820 of listing 710 (e.g., as a "click-to-dial" button), one or more coupons 830 offered by the business of listing 710, and a map 840 that depicts a geographic location of the business of listing 710. If customer 120 further selects map 840, detailed turn-by-turn directions 900, and a more detailed map 910 may be provided by the app at STB 105, as shown in FIG. 9. The resolution of map 910 may change as customer 120 interacts with controls of the user interface screen to zoom in or out of map 910. Customer 120 may also select key landmarks along the route to be displayed on the map (e.g., banks, bridges, shopping, etc.).

The app at STB 105 receives customer selection of a coupon, and obtains the coupon, or a link to the coupon, from coupon server 145 (block 435). STB 105 sends a message to the customer's mobile device 150, where the message includes the selected coupon and/or a link to the selected coupon (block 440). Referring to FIG. 1B, STB 105 obtains text, graphics or images, or text/graphics/images for the selected coupon ("6") and then sends ("7") the text, graphics or images, or text/graphics/images for the selected coupon to customer 120's mobile device 150 for presentation ("8" or "9") to customer 120 as coupon 175 or coupon 180. Alternatively, referring to FIG. 1C, STB 105 obtains a link (e.g, a Uniform Resource Locator) to the coupon stored at coupon server 145, and sends ("11") the link to mobile device 105. Upon receipt of the link to the coupon, mobile device 105 uses the link to retrieve ("12") the coupon from coupon server 145, and presents ("13") the coupon 180 to customer 120. Subsequent to block 440, the exemplary process may return to block 410 awaiting another business directory search.

Returning to block 410, when a coupon search is selected, the app at STB 105 receives a name or keyword of a coupon and a location to search (block 445). Referring again to the user interface screen 600 of FIG. 6, customer 120 may select, in a name/keyword field 615, a name or keyword associated with a business which customer 120 wishes to search for coupon offers. The name may include all, or a portion of, a specific business name, and the keyword may include any word, or portion of a word, that may be associated with a specific business or a type of business. Additionally, customer 120 may select, in a location field 620, a geographic location which customer wishes to search. The geographic location may include a specific city, or a current location associated with STB 105 or mobile device 150. Other types of search parameters, not shown in FIG. 6, may be selected from user interface screen 600. Such parameters may include, for example, a distance parameter (to identify businesses within a specified distance from STB 105 or mobile device 105 that are offering coupons), a price parameter (e.g., to identify businesses having low or high prices), or product and/or service parameters (e.g., that identify one or more products or services being searched by customer 120).

The app at STB 105 sends the name or keyword of the coupon and the location to search engine 140 at server 135 (block 450). Upon selection of the business name/keyword and/or the location in block 445, customer 120 may select the "find" button 625 in user interface screen 600 to cause the name/keyword of the business and the location to be sent to search engine 140 at search server 135 for searching for offered coupons.

STB 105 receives coupon search results and presents the coupon search results to customer 120 via TV 110 (block 455). STB 105 may, via TV 110, present a user interface screen that depicts each of the coupons of the coupon search results. Each of the coupons of the coupon search results may be selectable, by customer 120, from the user interface screen. The app at STB 105 receives customer selection of a coupon, and obtains the coupon or a link to the coupon from coupon server 145 (block 460). STB 105 sends a message to the customer's mobile device 150, where the message includes the selected coupon and/or a link to the selected coupon (block 465). STB 105 receives input from customer 120 that selects one of the selectable coupons from the presented user interface screen of block 455. Again referring to FIG. 1B, STB 105 obtains text, graphics or images, or text/graphics/images for the selected coupon ("6") and then sends ("7") the text, graphics or images, or text/graphics/images for the selected coupon via network 130 to customer 120's mobile device 150 for presentation ("8" or "9") to customer 120 as coupon 175 or coupon 180, respectively. Alternatively, referring to FIG. 1C, STB 105 obtains a link (e.g, a Uniform Resource Locator) to the coupon stored at coupon server 145, and sends ("11") the link to mobile device 150. Upon receipt of the link to the coupon, mobile device 150 uses the link to retrieve ("12") the coupon from coupon server 145, and presents ("13") the coupon 180 to customer 120. Customer 120 may subsequently cause the presented coupon 180 to be printed in hard copy form (e.g., via a printer networked with mobile device 150). Subsequent to block 465, the exemplary process may return to block 410 with another business directory search.

Figure 10:
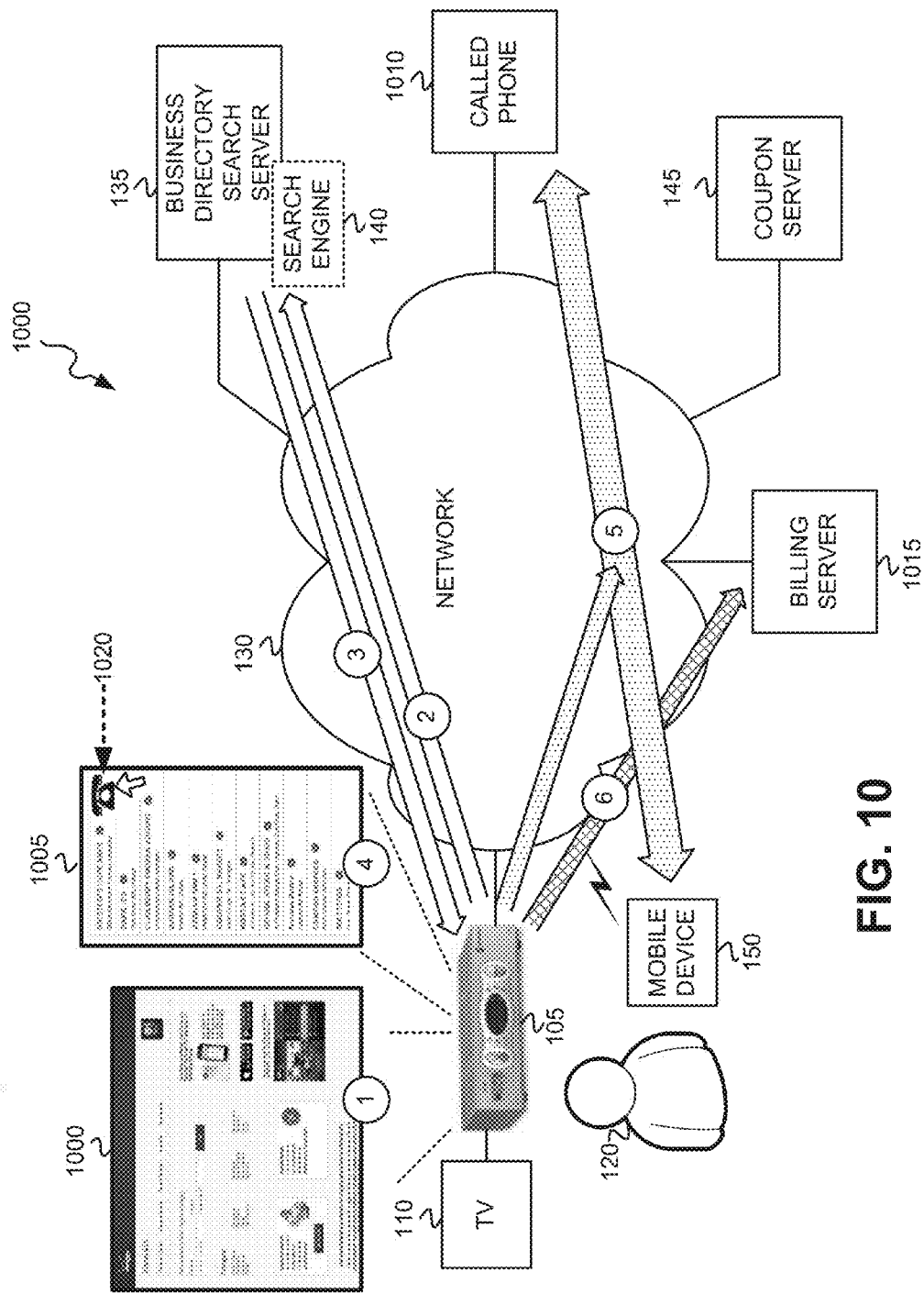
FIG. 10 depicts an overview of an exemplary embodiment in which a customer initiates a business directory search via a set-top box, the customer initiates a call to a business contained in the business directory search results, and the directory assistance search and/or the subsequent customer call are then automatically billed to the customer's account by a billing server.

FIG. 10 depicts an overview of an exemplary embodiment in which a customer initiates a business directory search via a STB, the customer initiates a call to a business contained in the business directory search results, and the directory assistance search and/or the subsequent customer call are then automatically billed to the customer's account by a billing server. In FIG. 10, an exemplary network environment 1000 includes similar network components to those depicted in FIGS. 1A-1C, with the addition of a called phone 1010 and a billing server 1015. Called phone 1010 may include a telephone (e.g., landline or mobile) associated with a business that is to be called by customer 120 via STB 105. Billing server 1015 may include a network device that receives data associated with a directory assistance request, and subsequent search by search engine 140, and/or data associated with a call made by customer 120 to the business associated with called phone 1010. The configuration of network components of network environment 1000 illustrated in FIG. 10 is for illustrative purposes only. Other configurations may be implemented. Network environment 1000 may include additional, fewer and/or different components than those depicted in FIG. 10.

As depicted in FIG. 10, customer 120 may, via a business directory user interface 1000 presented at TV 110 from STB 105 (shown with a "1" in FIG. 10), cause a business directory assistance request (shown with a "2") to be sent from STB 105 via network 130 to search engine 140 at server 135. The directory assistance request may include parameters associated with the businesses that customer 120 wishes to search. The parameters may include, for example, a business location (e.g., a city, near a specific geographic location etc.) and a business keyword (e.g., a business type). Upon receipt of the request, search engine 140 may search a corpus of businesses and may return business listing results that are relevant to the parameters contained in the directory assistance request. Server 135 may send business listing results (shown with a "3") to STB 105 for presentation to customer 120 as business listings 1005 (shown with a "4") via STB 105 and TV 110. Customer 120 may subsequently select a business from business listings 1005, and STB 105 may present information associated with the selected business. The information may include the business's address, phone number, email address, webpage(s), and a call "button" 1020 associated with the selected business.

Selection of call button 1020 by customer 120 causes STB 105 to initiate a call (shown with a "5") between mobile device 150 (or another telephone device associated with customer 120) and called phone 1010 via network 130. Subsequent to selection of call button 1020, STB 105, or STB 105 in conjunction with another network node, may send data (shown with a "6") associated with the directory assistance request and the call to called phone 1010 to billing server 1015. Billing server 1015 may, based on the received data, bill an account of customer 120 for the directory assistance request and/or the call.

Figure 11A:
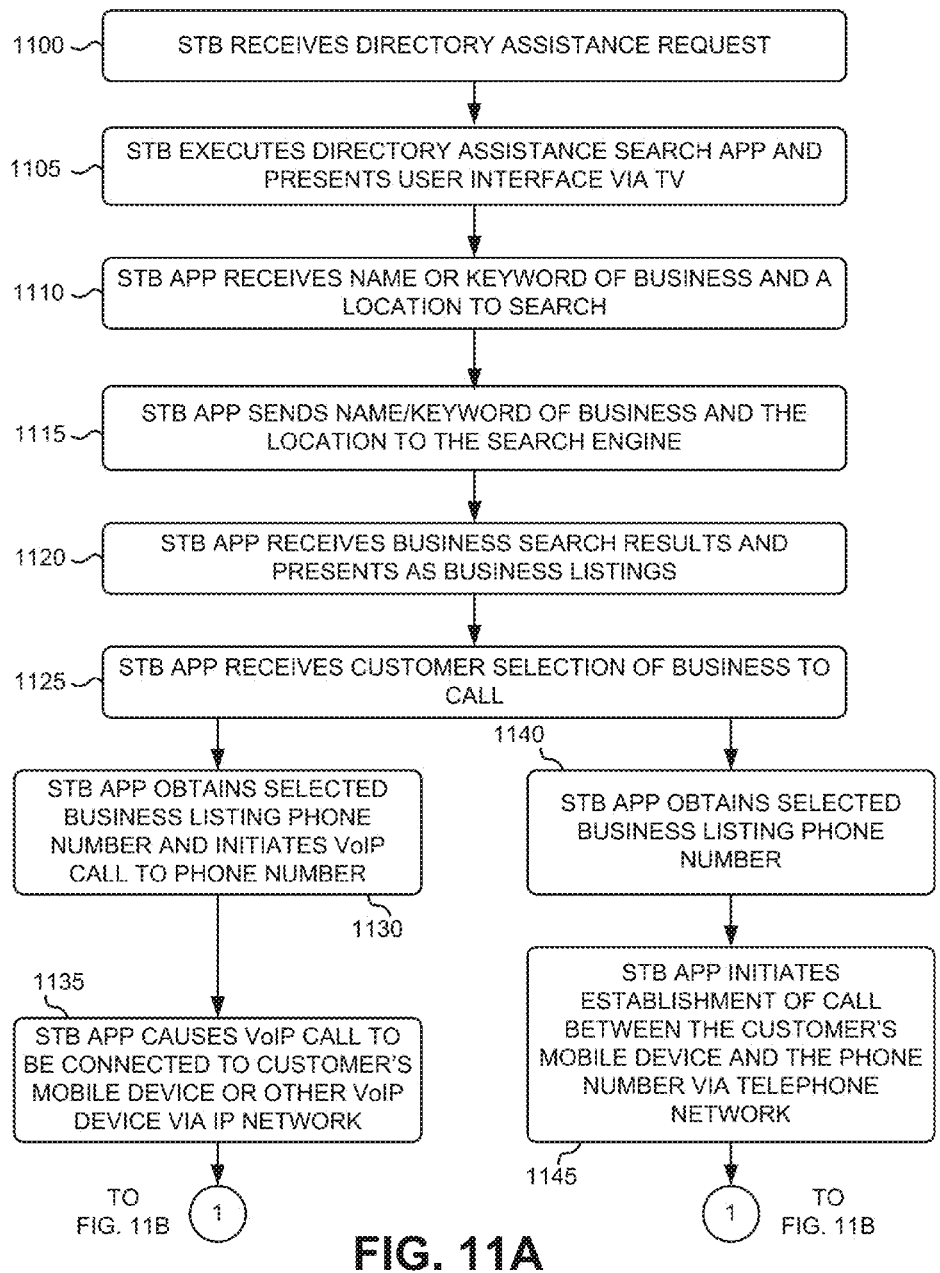
FIGS. 11A and 11B are flow diagrams that illustrate an exemplary process for executing a business directory search at a set-top box, initiating a call to a business contained in results of the business directory search at the set-top box, and automatically billing the business directory search and/or the call to a customer's account.
Figure 11B:
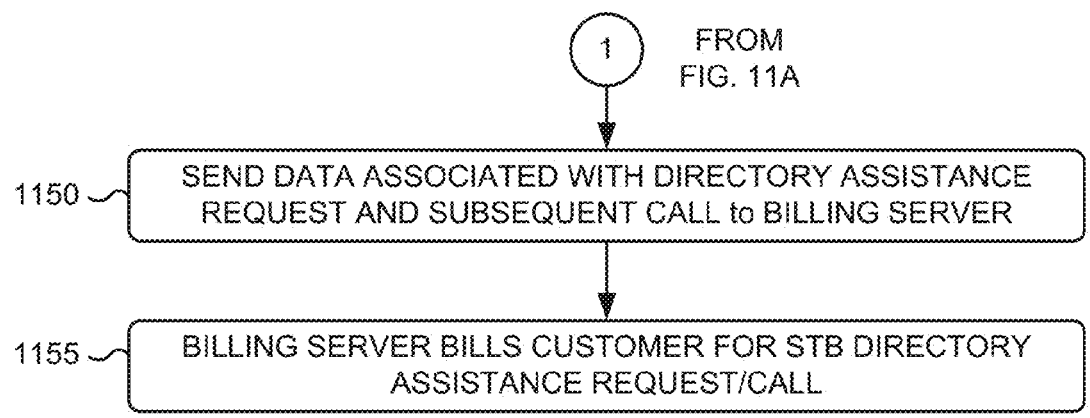

FIGS. 11A and 11B are flow diagrams that illustrate an exemplary process for executing a business directory search at a STB, initiating a call to a business included in results of the business directory search at the STB, and automatically billing the business directory search and/or the call to a customer's account. The exemplary process of FIGS. 11A and 11B may be implemented by STB 105. The description of the exemplary process of FIGS. 11A and 11B refers to FIG. 10, and the previously described examples of FIGS. 5-9.

The exemplary process may include STB 105 receiving a directory assistance request (block 1100) and, upon receipt of the request, STB 105 executes a directory assistance search application and presents a user interface via TV 110 (block 1105). Referring again to FIG. 5, this figure depicts user interface screen 500 that may be provided by STB 105 via TV 110. As shown, user interface screen 500 includes a menu 510 that permits customer 120 to select a business/coupon search 520 that enables the customer 120 to perform a business search or a business coupon search.

The application at STB 105 receives a name or keyword of a business and a location to search (block 1110). Referring again to the user interface screen 600 of FIG. 6, customer 120 may select, in a name/keyword field 615, a name or keyword associated with a business which customer 600 wishes to search. The name may include all, or a portion of, a specific business name, and the keyword may include any word, or portion of a word, that may be associated with a specific business or a type of business. Additionally, customer 120 may select, in a location field 620, a geographic location which customer wishes to search. The geographic location may include a specific city, or a current location associated with STB 105 or mobile device 150. Other types of search parameters, not shown in FIG. 6, may be selected from user interface screen 600. Such parameters may include, for example, a distance parameter (to identify businesses within a specified distance from STB 105 or mobile device 105), a price parameter (e.g., to identify businesses having low or high prices), or product and/or service parameters (e.g., that identify one or more products or services being searched by customer 120).

The application at STB 105 sends the name and/or keyword of the business and the location to search engine 140 at search server 135 (block 1115). Upon receipt of the business name/keyword and/or the location in block 1110, customer 120 may select the "find" button 625 in user interface screen 600 to cause the name/keyword of the business and the location to be sent (block 1115) to search engine 140 at search server 135. The application at STB 105 receives business search results and presents the business search results as business listings (block 1120). FIG. 7 depicts a set 700 of business listings received from search engine 140 and presented to customer 120. As shown in FIG. 7, customer 120 may select a listing 710 from the set 700 of business listings to obtain further information regarding listing 710.

The application at STB 105 receives a customer selection of a business to call (block 1125). Customer 120 may select a business listing from the search results, and present the business listing. Once the listing 710 from the set 700 of business listings is selected, the app at STB 105 presents, as shown in FIG. 8, details 800 of the selected business listing 710 (including address information 810), the telephone number 820 of listing 710 (e.g., as a "click-to-dial" button), one or more coupons 830 offered by the business of listing 710, and a map 840 that depicts a geographic location of the business of listing 710. If customer 120 further selects map 840, detailed turn-by-turn directions 900, and a more detailed map 910 may be provided by the app at STB 105, as shown in FIG. 9. Customer 120 may select the business to call by selecting "click-to-dial" button 820, which displays the business's telephone number, from the user interface screen.

In an exemplary embodiment in which the call to the business of the selected business listing is implemented as a VoIP call via an IP network, the application at STB 105 obtains the selected business listing's phone number and initiates a VoIP call to the phone number (block 1130). The initiated VoIP call may be designated as originating from a VoIP telephone number associated with customer 120 (e.g., a Verizon FiOS Digital Voice telephone number). The application at STB 105 causes the VoIP call to be connected to customer 120's mobile device 150, or to another VoIP device (e.g., tablet computer, Personal Digital Assistant, etc.), via the IP network (block 1135). The other VoIP device may, for example, be a telephone connected to the IP network (e.g., via a VoIP service). STB 105 may interact with an external VoIP network device (e.g. a VoIP call server) to cause the VoIP call to be connected between customer 120's mobile device 150, or another VoIP device, and called phone 1010 via the IP network. The called phone 1010 may reside in telephone network, and the call may bridge between the IP network and the telephone network. The exemplary process continues at block 1150 (FIG. 11B).

In an exemplary embodiment in which the call to the business of the selected business listing is implemented as a call via a telephone network (e.g., PSTN or cellular network), the application at STB 105 obtains the selected business listing's phone number (block 1140). The application at STB 105 initiates establishment of the call between customer 120's mobile device 150 and the phone number via the telephone network (block 1145). STB 105 may interact with an external node in the telephone network to cause the call to be connected between customer 120's mobile device, or other telephone network device (e.g., landline telephone), and called phone 1010 via the telephone network. The exemplary process continues at block 1150. In some embodiments, customer 120 may select (e.g, via STB 105, or via customer preferences or a customer profile) whether the STB app initiates the VoIP call via the VoIP network, (e.g., blocks 1130 and 1135) or via the telephone network (e.g., blocks 1140 and 1145).

Subsequent to blocks 1135 or 1145, STB 105, or another network node, may send data associated with the directory assistance request and the subsequent call to billing server 1015 (block 1150). STB 105, or a network node involved in establishing and/or monitoring the phone call, may send the data to billing server 1015 over network 130. The data may include, for example, a unique identifier associated with customer 120, the telephone number of called phone 1010, a number of minutes of duration of the phone call, a time and date of the phone call, etc. Billing server 1015 bills customer 120 for the STB directory assistance request and/or call (block 1155). A fee may be billed to an account associated with customer 120 for each call initiated from a directory assistance request.

The foregoing description of implementations provides illustration and description, but is not intended to be exhaustive or to limit the invention to the precise form disclosed. Modifications and variations are possible in light of the above teachings or may be acquired from practice of the invention. FIGS. 4A and 4B describe an exemplary process for conducting a business directory or coupon search at a set-top box, and subsequent provision of a selected coupon to another device (e.g., mobile device) based on selection at the STB. In other implementations, the business directory or coupon search may be performed at a non-STB device, and then delivered to a second device. For example, the business directory or coupon search may be performed on a desktop computer, and a selected coupon may be delivered to the customer's mobile device. As another example, the business directory or coupon search may be performed on a cellular phone (e.g., smart phone), and a selected coupon may be delivered to the customer's tablet computer. Exemplary embodiments herein describe processes for conducting business directory or coupon searches, for obtaining coupons, and for initiating calls from a business directory search. Additional embodiments may include processes for tracking and optimizing the features described herein by usage, device, business category, time of day, location, proximity, context, relevancy, amount of money spent, billing or duration of use. While a series of blocks have been described with regard to FIGS. 4A, 4B, 11A and 11B, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at a set-top box (STB) from a customer, a request for a business directory search, wherein the STB receives television (TV) video programs via one or more channels over a network, and wherein the network comprises a cable, a satellite, or an Advanced Television Systems Committee standards (ATSC) network;
   obtaining a listing of businesses responsive to the request;
   generating, at the STB, a graphical user interface for display;
   presenting, using a display device, the obtained listing of businesses via the graphical user interface generated by the STB, wherein presenting the obtained listing of businesses via the graphical user interface generated by the STB further comprises:
      presenting, via the graphical user interface, a listing of names associated with each business in the listing of businesses in association with other information, and
      presenting, in association with each business in the listing of businesses within the graphical user interface, a selectable button that displays a phone number of each respective business and which is selectable by the customer via the STB;
   receiving, from the customer via the graphical user interface at the STB, a selection of a business from the listing of businesses to call, wherein receiving the selection of the business from the listing of businesses to call comprises:
      receiving, from the customer, a selection of the selectable button, presented within the graphical user interface, that displays the phone number of each respective business;
   performing one of:
      initiating, by the STB responsive to the customer's selection of the selectable button that displays the phone number, a voice call as a Voice over Internet Protocol (VoIP) call to the phone number associated with the business, and connecting the VoIP call to a mobile device, or other VoIP device, associated with the customer via a VoIP network, or
      initiating, by the STB responsive to the customer's selection of the selectable button that displays the phone number, establishment of a voice call between the phone number associated with the business and the mobile device, or other telephone network device, associated with the customer via a telephone network,
   wherein the STB is a different device than the mobile device, the other VoIP device, or the other telephone network device.

2. The method of claim 1, further comprising:
   receiving one or more search parameters associated with the request,
   wherein obtaining the listing of businesses comprises:
      sending the one or more search parameters to a search engine; and
      receiving, based on the one or more search parameters, the listing of businesses from the search engine.

3. The method of claim 2, wherein the one or more search parameters comprise a name or keyword and a location.

4. The method of claim 1, wherein the initiating the voice call as a VoIP call comprises:
   interacting, by the STB, with an external VoIP call server to cause the voice call to be connected between a called phone associated with the phone number associated with the business and the mobile device, or the other VoIP device, associated with the customer.

5. The method of claim 1, wherein initiating establishment of the voice call via the telephone network comprises:
   interacting, by the STB, with an external node in the telephone network to cause the voice call to be connected between a called phone associated with the phone number associated with the business and the mobile device, or the other telephone network device, associated with the customer.

6. The method of claim 1, further comprising:
   sending, from the STB, data associated with the request for the business directory search to a billing server for billing the customer for the request for the business directory search received at the STB.

7. A set-top box, comprising:
   a memory configured to store instructions;
   a communication interface;
   a tuner and other components configured to tune to one or more channels over a network to receive television (TV) video programs, wherein the network comprises a cable, a satellite, or an Advanced Television Systems Committee standards (ATSC) network;
   a processing unit configured to execute the instructions to:
      receive a request for a business directory search from a customer,
      obtain a listing of businesses responsive to the request,
      generate a user interface for display,
      present, using a display device, the obtained listing of businesses via the user interface generated by the STB, wherein, when presenting the obtained listing of businesses via the user interface generated by the STB, the processing unit is further configured to:
         present, via the user interface, a listing of names associated with each business in the listing of businesses in association with other information, and
         present, in association with each business in the listing of businesses within the user interface, a selectable button that displays a phone number of each respective business and which is selectable by the customer,
      receive, from the customer via the user interface, a selection of a business from the listing of businesses to call, wherein, when receiving the selection of the business from the listing of businesses to call, the processing unit is further configured to:
         receive, from the customer, a selection of the selectable button, presented within the user interface, that displays the phone number of each respective business, and
      perform one of:
         initiate, responsive to the customer's selection of the selectable button that displays the phone number, a voice call as a Voice over Internet Protocol (VoIP) call to the phone number associated with the selected business and connect the VoIP call to a mobile device, or other VoIP device, associated with the customer via a VoIP network, or initiate, responsive to the customer's selection of the selectable button that displays the phone number, establishment of a voice call between the phone number associated with the selected business and the mobile device, or other telephone network device, associated with the customer via a telephone network, wherein the STB is a different device than the mobile device, the other VoIP device, or the other telephone network device.

8. The set-top box of claim 7, wherein the mobile device comprises one of a desktop, laptop, palmtop or tablet computer; a cellular telephone; or a personal digital assistant (PDA).

9. The set-top box of claim 7, wherein, when initiating the voice call as a VoIP call, the processing unit is further configured to execute the instructions to:

interact with an external VoIP call server to cause the voice call to be connected between a called phone associated with the phone number associated with the business and the mobile device, or the other VoIP device, associated with the customer.

10. The set-top box of claim 7, wherein, when initiating establishment of the voice call via the telephone network, the processing unit is further configured to execute the instructions to:

interact with an external node in the telephone network to cause the voice call to be connected between a called phone associated with the phone number associated with the business and the mobile device, or the other telephone network device, associated with the customer.

11. The set-top box of claim 7, wherein the processing unit is configured to execute the instructions to:

send, via the communication interface, data associated with the request for the business directory search to a billing server for billing the customer for the request for the business directory search received at the STB.

12. A non-transitory storage medium storing instructions executable by a computational device, wherein the instructions comprise instructions to:

receive, at a set-top box (STB) from a customer, a request for a business directory search, wherein the STB receives television (TV) video programs via one or more channels over a network, and wherein the network comprises a cable, a satellite, or an Advanced Television Systems Committee standards (ATSC) network;

obtain a listing of businesses responsive to the request;

generate, by the STB, a graphical user interface for display;

present, using a display device, the obtained listing of businesses via the graphical user interface generated by the STB, wherein the instructions to present the obtained listing of businesses via the graphical user interface generated by the STB further comprise instructions to:

present, via the graphical user interface, a listing of names associated with each business in the listing of businesses in association with other information, and present, in association with each business in the listing of businesses within the graphical user interface, a selectable button that displays a phone number of each respective business and which is selectable by the customer via the STB, receive, from the customer via the graphical user interface at the STB, a selection of a business from the listing of businesses to call, wherein the instructions to receive the selection of the business from the listing of businesses to call further comprise instructions to:

receive, from the customer, a selection of the selectable button, presented within the graphical user interface, that displays the phone number of each respective business, perform one of:

initiate, by the STB responsive to the customer's selection of the selectable button that displays the phone number, a voice call as a Voice over Internet Protocol (VoIP) call to the phone number associated with the business, and connecting the VoIP call to a mobile device, or the other VoIP device, associated with the customer via a VoIP network, or initiate, by the STB responsive to the customer's selection of the selectable button that displays the phone number, establishment of a voice call between the phone number associated with the business and the mobile device, or other telephone network device, associated with the customer via a telephone network, wherein the STB is a different device than the mobile device, the other VoIP device, or the other telephone network device.

13. The non-transitory storage medium of claim 12, wherein the instructions to initiate the voice call as a VoIP call further comprise instructions to:

interact, by the STB, with an external VoIP call server to cause the voice call to be connected between a called phone associated with the phone number associated with the business and the mobile device, or the other VoIP device, associated with the customer.

14. The non-transitory storage medium of claim 12, wherein the instructions to initiate the establishment of the voice call via the telephone network further comprise instructions to:

interact, by the STB, with an external node in the telephone network to cause the call to be connected between a called phone associated with the phone number associated with the business and the mobile device, or the other telephone network device, associated with the customer.

15. The non-transitory storage medium of claim 12, further comprising instructions to:

cause to be sent, from the STB to a billing server, data associated with the request for the business directory search for billing the customer for the request for the business directory search received at the STB.

16. A method, comprising:

obtaining, at a set-top box (STB), a listing of businesses, wherein the STB receives television (TV) video programs via one or more channels over a network, and wherein the network comprises a cable, a satellite, or an Advanced Television Systems Committee standards (ATSC) network;

generating, by the STB, a graphical user interface for display on a display device;

presenting, via the graphical user interface on the display device, a listing of names associated with each business in the listing of businesses in association with other information;

presenting, in association with each business in the listing of businesses within the graphical user interface, a selectable button that indicates a phone number of each respective business and which is selectable by a customer;

receiving, at the STB from the customer via the graphical user interface, a selection of the selectable button, presented within the graphical user interface, that indicates the phone number of each respective business;

performing one of:

initiating, by the STB responsive to the customer's selection of the selectable button that indicates the phone number, a voice call as a Voice over Internet Protocol (VoIP) call to the phone number associated with the business, and connecting the VoIP call to a mobile device, or other VoIP device, associated with the customer via a VoIP network, or initiating, by the STB responsive to the customer's selection of the selectable button that indicates the phone number, establishment of a voice call between the phone number associated with the business and the mobile device, or other telephone network device, associated with the customer via a telephone network, wherein the STB is a different device than the mobile device, the other VoIP device, or the other telephone network device.

17. The method of claim 16, wherein obtaining the listing of businesses comprises:

receiving, at the STB from the customer, one or more search parameters associated with a business directory search;

sending the one or more search parameters to a search engine; and receiving, based on the one or more search parameters, the listing of businesses from the search engine.

18. The method of claim 17, wherein the one or more search parameters comprise a name or keyword and a location.

19. The method of claim 16, wherein the initiating the voice call as a VOIP call comprises:

interacting, by the STB, with an external VoIP call server to cause the voice call to be connected between a called phone associated with the phone number associated with the business and the mobile device, or the other VoIP device, associated with the customer.

20. The method of claim 16, wherein initiating establishment of the voice call via the telephone network comprises:

interacting, by the STB, with an external node in the telephone network to cause the call to be connected between a called phone associated with the phone number associated with the business and the mobile device, or the other telephone network device, associated with the customer.

* * * * *